M. B. FOX.
BED STRUCTURE FOR AUTOMOBILES.
APPLICATION FILED NOV. 13, 1918.
1,322,100.
Patented Nov. 18, 1919.
2 SHEETS—SHEET 1.
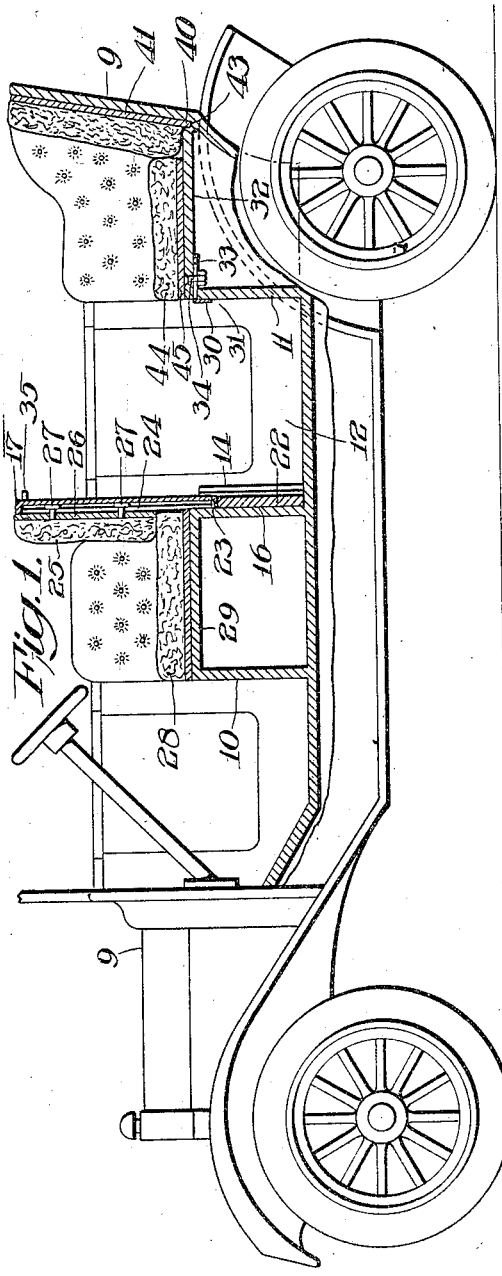
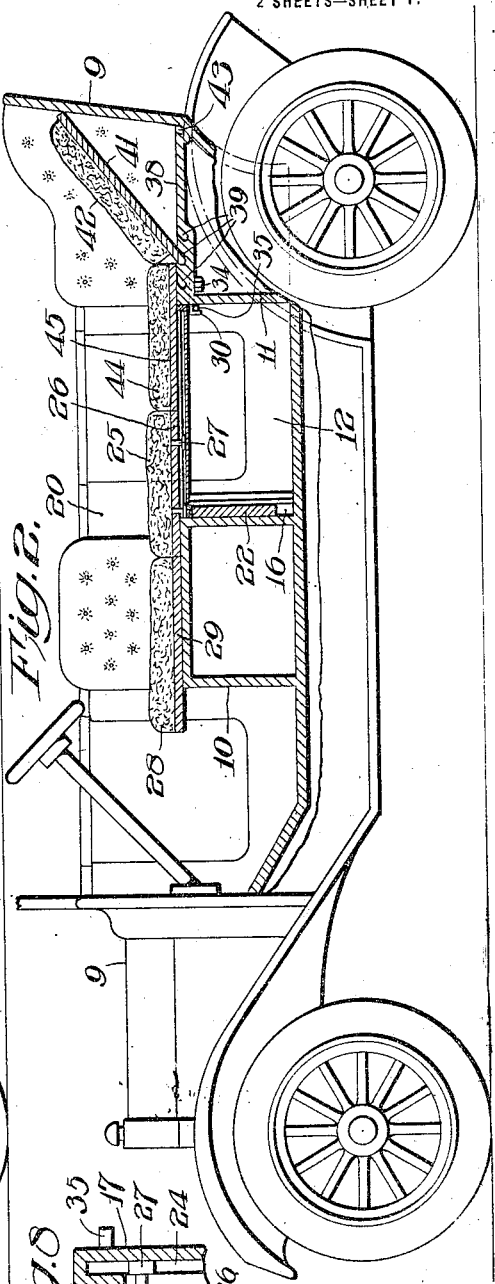
WITNESSES:
INVENTOR
Michael B. Fox
BY
HIS ATTORNEY

M. B. FOX.
BED STRUCTURE FOR AUTOMOBILES.
APPLICATION FILED NOV. 13, 1918.

1,322,100.

Patented Nov. 18, 1919.
2 SHEETS—SHEET 2.

Fig. 3.
Fig. 4.
Fig. 5.
Fig. 6.
Fig. 7.

WITNESSES:

INVENTOR
Michael B. Fox,
BY
HIS ATTORNEY

UNITED STATES PATENT OFFICE.

MICHAEL B. FOX, OF PHILADELPHIA, PENNSYLVANIA.

BED STRUCTURE FOR AUTOMOBILES.

1,322,100.  Specification of Letters Patent.  Patented Nov. 18, 1919.

Application filed November 13, 1918. Serial No. 262,276.

*To all whom it may concern:*

Be it known that I, MICHAEL B. FOX, a citizen of the United States, residing at Philadelphia, in the county of Philadelphia and State of Pennsylvania, have invented certain new and useful Improvements in Bed Structures for Automobiles, of which the following is a specification.

One object of my invention is to provide a convertible structure for vehicles to permit the seats to be arranged in such manner that they will provide a couch or bed so that the occupants of the vehicle can lie down and still be entirely within the vehicle.

Another object is to so construct my invention that the parts will be arranged in sections so that while one person is running the vehicle in the usual manner, another person can lie down upon other sections which are arranged in the couch or bed formation above described.

A still further object is to make my invention of simple construction and so that the parts can be easily manipulated and changed from a normal seat position to that of a bed structure.

Another object is to so make my invention that it is applicable with comparatively little change to various forms of automobiles now in common use.

These objects, and other advantageous ends which will be described hereinafter, I attain in the following manner, reference being had to the accompanying drawings in which—

Figure 1 is an elevation partly in longitudinal section of an automobile constructed in accordance with my invention and showing the same in a normal position, Fig. 2 is a view of similar character to Fig. 1 showing the parts arranged in the form of a couch or bed, Fig. 3 is a plan view of sufficient of the automobile shown in Figs. 1 and 2 to illustrate my invention and showing certain of the parts occupying their normal position as seats while others of the parts are arranged to provide a bed or couch structure, Fig. 4 is a transverse section taken on the line 4—4 of Fig. 3, Fig. 5 is a fragmentary plan view of the rear seat with the cushions removed, Fig. 6 is a perspective view of certain of the parts of my invention, Fig. 7 is a fragmentary perspective view of one of the back seat cushions, and Fig. 8 is a fragmentary sectional elevation showing certain of the parts of my invention.

Referring to the drawings, 9 represents an automobile of a well known type having front and rear box seats 10 and 11 respectively, there being the usual space 12 between the rear of the front seat and the front of the rear seat. Standards 13, 14 and 15 are mounted to the rear of the box seat 10 and provide slideways 16 for seat backs 17 and 18. The standard 14 is mounted midway between the standards 13 and 15, said latter standards being secured adjacent the seat sides 19 and 20 of the automobile.

Each of the seat backs is similarly constructed and consists of an upper section 21 and a lower section 22 which are joined together by a hinge 23, said hinge preferably running the full width of the back. The seat backs 17 and 18 are adapted to be slid within the slideways 16 and when in their upright position, as shown in Fig. 1 and at the left hand side of Fig. 4, the hinges 23 of the seat backs are within the slideways 16 and below the tops of the standards. It is thus imposible for the top sections of the seat backs to move on their hinges. However, if the seat backs are raised until the hinges 23 are above the top of the standards 13, 14 and 15 the sections 21 can be swung rearwardly on the hinges 23 for a purpose hereinafter described; it being noted that the lower sections 22 remain within the slideways 16.

The front of the seat backs 17 and 18 are provided with undercut grooves 24 which extend in the direction of the height of said backs. Cushions 25 are mounted on base boards 26 and these base boards have headed pins 27 which extend rearwardly, the heads being positioned within the undercut grooves 24 of the seat back sections 21. Thus the back cushions 25 on their base boards 26 are capable, under certain conditions, of sliding relatively to the seat backs 17 in the direction of the length of the grooves 24 but the engagement of the headed pins 27 in the undercut grooves prevent relative movement in a transverse direction. In other words the headed pins 27 slidably secure the back cushions 25 to the seat backs 17.

Front seat cushions 28 are mounted on base boards 29 and the rear portions of the seat cushions 28 normally form a support for the back cushions 25 and keep them in their proper positions relatively to the height of the seat backs 17, as clearly shown in Fig. 1.

Brackets 30 are slidable in slots 31 cut in the rear box seat 11, the tops of said slots being in alinement with the inner top surface 32 of said box seat 11. The brackets 30 have slots 33 therein through which project bolts 34 in the box seat 11. These bolts limit the outward movement of the brackets 30 and the slots 33 are of sufficient length that when the brackets are pulled out, as clearly shown in Figs. 2 and 5, the slots 33 provide sockets which will receive lugs 35 mounted on the rear of the seat backs 17; it being noted that the seat backs must first be raised, as previously described, so that the hinges 23 clear the tops of the standards 13, 14 and 15 and the sections 21 then swung downwardly to bridge the space 12 between the front and rear seats, such position being shown in Fig. 2 and at the right hand of the vehicle as illustrated in Figs. 3 and 4.

It will be noted that when the sections 21 are lowered to rest upon the brackets 30 that the surfaces 36 of the seat backs 17 are flush with the top surface 37 of the top 38 of the box seat 11. The top 38 of the seat 11 has two series of notches 39 adapted to be engaged by tongues 40 on base boards 41 of rear seat back cushions 42. The top 38 is also provided with notches 43 at their extreme rear parts to receive the tongues 40 when the back cushions 42 are in their normal positions, for example as shown in Fig. 1. The rear seat 11 is provided with seat cushions 44 which are mounted on base boards 45.

It is thus obvious that either or both sides of the seat structure can be manipulated to form a bed structure; the first step necessary to convert the seat structure into a bed structure being to pull out the brackets 30, then raise the seat backs and swing the sections 21 on the hinges 23 to permit the lugs 35 to engage within the forward ends of the slots 33. The seat cushions 28 can then be slid forwardly and the back cushions 25 can be slid forwardly to abut the rear edges of the seat cushions 28. The seat cushions 44 can be then slid forwardly partway upon the surfaces 36 of the seat backs 17 until their forward edges abut the rear edges of the back cushions 25. The rear seat back cushions 42 can then be slightly raised until the tongues 40 disengage from the notches 43 and said back cushions 42 can be inclined at a suitable angle and the tongues 40 arranged within any of the notches 39 according to the angle desired to permit the back cushions 42 to form a head rest or pillow. The engagement of the lugs 35 in the slots 33 prevents accidental movement of the brackets 30 and a secure support is provided by the brackets 30 and also by the tops of the standards 13, 14 and 15 for the sections 21 of the seat backs 17 and 18.

As previously stated and as illustrated in Fig. 3 if desired only one-half of the seat structure can be converted into a bed structure, the other half of the front and rear seats being permitted to remain normal. This renders my invention particularly valuable for ambulance service since the front half of the seat can be occupied by the driver and the half of the seat in the rear can be occupied by an attendant if the bed structure is occupied by a sick passenger or the like.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A vehicle including a seat; means adjacent said seat providing a slideway; a seat back made in sections; and a hinge connecting said sections, said seat back sections and hinge being adapted to be supported within said slideway whereby the sections are prevented from turning on said hinge and the seat back is held with the sections in an upright position, said seat back sections being adapted to be freely moved lengthwise within said slideway whereby the hinge is moved therefrom to permit one of the sections to be turned in substantial alinement with the top of said seat to provide a bed structure in conjunction with said seat; substantially as described.

2. A vehicle including a seat; a standard adjacent said seat and providing an upright slideway; a seat back made in sections; and a hinge connecting said sections, said seat back sections and hinge being adapted to be supported within said slideway whereby the sections are prevented from turning on said hinge and the seat back is held with the sections in an upright position, said seat back sections being adapted to be freely moved lengthwise within said slideway whereby the hinge is moved therefrom to permit one of the sections to be turned in substantial alinement with the top of said seat to provide a bed structure in conjunction with said seat, said standard having a portion adapted to support said latter mentioned section to hold said latter section in said turned position; substantially as described.

In testimony whereof I have signed my name to this specification in the presence of two subscribing witnesses.

MICHAEL B. FOX.

Witnesses:
MARY A. INGLOR,
CHAS. E. POTTS.